(12) United States Patent
Oh et al.

(10) Patent No.: US 10,795,963 B2
(45) Date of Patent: Oct. 6, 2020

(54) APPARATUS AND METHOD FOR INVITING SUBSCRIPTION TO CONTACT INFORMATION

(71) Applicant: Samsung Electronics Co., Ltd., Gyeonggi-do (KR)

(72) Inventors: Gyu-Bong Oh, Gyeonggi-do (KR); Wuk Kim, Gyeonggi-do (KR); Kyung-Tak Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 944 days.

(21) Appl. No.: 14/362,753

(22) PCT Filed: Dec. 7, 2012

(86) PCT No.: PCT/KR2012/010638
§ 371 (c)(1),
(2) Date: Jun. 4, 2014

(87) PCT Pub. No.: WO2013/085342
PCT Pub. Date: Jun. 13, 2013

(65) Prior Publication Data
US 2014/0344215 A1   Nov. 20, 2014

(30) Foreign Application Priority Data
Dec. 8, 2011   (KR) .................. 10-2011-0131358

(51) Int. Cl.
*G06F 16/957* (2019.01)
*H04L 29/12* (2006.01)
(Continued)

(52) U.S. Cl.
CPC ......... *G06F 16/957* (2019.01); *G06Q 10/107* (2013.01); *H04L 61/1594* (2013.01); *H04L 67/02* (2013.01); *H04L 67/1095* (2013.01)

(58) Field of Classification Search
CPC ........... G06F 17/30899; G06F 16/957; G06Q 10/107; H04L 61/1594; H04L 67/02; H04L 67/1095
(Continued)

(56) References Cited

U.S. PATENT DOCUMENTS 8,611,873 B2 * 12/2013 Onyon .............. H04L 29/12047
370/328
2009/0028303 A1   1/2009 Brunson et al.
(Continued)

FOREIGN PATENT DOCUMENTS

| CN | 101771691 | 7/2010 |
| CN | 102075644 | 5/2011 |

(Continued)

OTHER PUBLICATIONS

Chinese Office Action dated Jul. 1, 2016 issued in counterpart application No. 201280060404.9, 16 pages.
(Continued)

*Primary Examiner* — Hosain T Alam
*Assistant Examiner* — Saba Ahmed
(74) *Attorney, Agent, or Firm* — The Farrell Law Firm, P.C.

(57) ABSTRACT

Disclosed is a method of efficiently inviting a subscription to contact information, the method including receiving a subscription invitation request of particular contact information of a first client from the first client; and determining whether a condition for allowing the subscription to the particular contact information is included in the subscription invitation request, and transmitting a subscription request containing address information by which the condition and the particular contact information can be received to a second client when the condition is included. Accordingly, it is possible to provide a communication service at a high speed in a
(Continued)

communication system supporting various types of communication services without a waste of resources, power, or memories. Also, it is possible to provide a data transmission/reception method capable of easily and quickly providing a CAB service according to a selection by user's intention.

14 Claims, 9 Drawing Sheets (51) Int. Cl.
*G06Q 10/10* (2012.01)
*H04L 29/08* (2006.01)

(58) Field of Classification Search
USPC .......................................................... 707/608
See application file for complete search history.

(56) References Cited

U.S. PATENT DOCUMENTS

| | | | |
|---|---|---|---|
| 2009/0100099 A1 | 4/2009 | Buckwalter | |
| 2010/0077027 A1 | 3/2010 | Chitturi et al. | |
| 2010/0082761 A1* | 4/2010 | Nguyenphu | G06F 17/30165 709/206 |
| 2010/0088105 A1 | 4/2010 | Feldhahn | |
| 2010/0198854 A1* | 8/2010 | Chitturi | G06F 17/30864 707/760 |
| 2010/0211634 A1* | 8/2010 | Song | G06Q 10/107 709/203 |
| 2010/0317322 A1 | 12/2010 | Underwood et al. | |
| 2010/0325208 A1 | 12/2010 | Chitturi et al. | |
| 2011/0055901 A1* | 3/2011 | Karaoguz | G06F 21/10 726/4 |
| 2011/0112976 A1 | 5/2011 | Ryan et al. | |
| 2011/0113113 A1 | 5/2011 | Ryan et al. | |
| 2011/0145270 A1* | 6/2011 | Christopher | G06F 17/30867 707/769 |
| 2011/0173223 A1* | 7/2011 | Chitturi | G06Q 10/107 707/769 |
| 2011/0208772 A1* | 8/2011 | Mostafa | G06F 17/30997 707/769 |
| 2011/0214051 A1* | 9/2011 | Petronijevic | G06F 16/84 715/255 |
| 2011/0252091 A1 | 10/2011 | Chitturi | |
| 2011/0295988 A1* | 12/2011 | Le Jouan | G06F 21/31 709/223 |
| 2012/0324009 A1* | 12/2012 | Lee | H04L 51/32 709/204 |
| 2013/0091287 A1* | 4/2013 | Chitturi | G06Q 10/10 709/227 |
| 2013/0110776 A1* | 5/2013 | Nunez Diaz | G06F 17/30575 707/624 |
| 2013/0262576 A1* | 10/2013 | Foti | G06F 9/542 709/204 |
| 2014/0040188 A1* | 2/2014 | Oh | G06F 17/30374 707/609 |
| 2014/0143675 A1* | 5/2014 | Lee | H04L 67/10 715/739 |

FOREIGN PATENT DOCUMENTS

| | | |
|---|---|---|
| WO | WO 2007/089415 | 8/2007 |
| WO | WO 2010/062135 | 6/2010 |

OTHER PUBLICATIONS

Japanese Office Action dated Nov. 6, 2017 issued in counterpart application No. 2014-545826, 9 pages.
OMA, Converged Address Book (CAB) Specification, Draft Version 1.1, Open Mobile Alliance, OMA-TS-CAB-V1_1-20111129-D, Nov. 29, 2011, 86 pages.
Gyubong Oh, "CAB 1.1 AD Contact Invitation Flows", OMA-COM-CAB-2011-0011R01-CR_CAB_1_1_AD_Contact_Invitation_Flows.doc, Nov. 4, 2011, 4 pages.
Gyubong Oh, "Clarifications on XDM Forward from CAB Server", OMAG-MWG-CAB-2010-0011-INP_Clarifications_on_XDM_Foward_from_CAB_Server, Jan. 7, 2010, 10 pages.
European Search Report dated Jul. 10, 2015 issued in counterpart application No. 12855762.6-1853, 9 pages.
Japanese Office Action dated Dec. 12, 2016 issued in counterpart application No. 2014-545826, 12 pages.
PCT/ISA/237 Written Opinion issued on PCT/KR2012/010638 (pp. 4).
PCT/ISA/210 Search Report issued on PCT/KR2012/010638 (pp. 4).
Korean Office Action dated Mar. 20, 2018 issued in counterpart application No. 10-2011-0131358, 13 pages.

* cited by examiner

```
<cab-feature id="abab1212 >
<contact-share>
  <recipients-list>
   <list>
       <entry uri=sip:bob@example.com/>
    </list>
  </recipients-list>
      <note>contact subscription invitation</note>
      <display-name>happy alice</display-name>
      <format>vCard</format>
      <delivery-report-request>true</delivery-report-request>
      <data>
        <PCC>my friends view</PCC>
        <!--filter to be applied to the CAB User s PCC before the recipient invite for contact
          subscriptoin-->
     <fi:filter-set>
      <fi:ns-bindings>
        <fi:ns-binding prefix="pcc" urn="urn:oma:xml:cab:pcc"/>
      </fi:ns-bindings>
      <fi:filter id="invite-include >
        <fi:what>
           <fi:include type="xpath">//pcc:pcc/pcc:personal-details/pcc:name</fi:include>
           <fi:include type="xpath">//pcc:pcc/pcc:personal-details/pcc:comm-addr</fi:include>
           <fi:include type="xpath">//pcc:pcc/pcc:personal-details/pcc:career-history</fi:include>
        </fi:what>
      </fi:filter>
     </fi:filter-set>
   </data>
</contact-share>
</cab-feature>
```

[Fig. 6]

```xml
<?xml version="1.0" encoding="UTF-8"?>
<ap-rules xmlns="urn:oma:xml:xdm:ap"
    xmlns:cp="urn:ietf:params:xml:ns:common-policy"
    xmlns:ocp="urn:oma:xml:xdm:common-policy">
<access-permissions-document-rule>
 <cp:ruleset>
  <cp:rule id="ap-admin">
    <cp:conditions>
        <cp:identity>
            <cp:one id="sip:alice@example1.com"/>
        </cp:identity>
    </cp:conditions>
    <cp:actions>
        <allow-any-operation/>
     </cp:actions>
    </cp:rule>
<cp:rule id="ap-own-many">
    <cp:conditions>
        <cp:identity>
            <cp:many/>
        </cp:identity>
    </cp:conditions>
    <cp:actions>
        <allow-retrieve-own-data/>
     </cp:actions>
    </cp:rule>
   </cp:ruleset>
</access-permissions-document-rule>
<directory-rule>
 <cp:ruleset>
  <cp:rule id="allow-all">
    <cp:conditions>
        <cp:identity>
            <cp:one id="sip:alice@example1.com"/>
        </cp:identity>
    </cp:conditions>
    <cp:actions>
        <allow-any-operation/>
     </cp:actions>
    </cp:rule>
   </cp:ruleset>
</directory-rule>
<document-rule path="pcc">
<cp:ruleset>
  <cp:rule cp:id="allow-retrieve">
    <cp:conditions>
        <cp:identity>
            <cp:one id="sip:bob@example.com"/>
        </cp:identity>
    </cp:conditions>
    <cp:actions>
        <allow-retrieve/>
     </cp:actions>
    <cp:transformations>
        <fi:filter-set>
         <fi:ns-bindings>
          <fi:ns-binding prefix="pcc" urn="urn:oma:xml:cab:pcc"/>
         </fi:ns-bindings>
         <fi:filter id="invite-include">
           <fi:what>
            <fi:include type="xpath">//pcc:pcc/pcc:personal-details/pcc:name</fi:include>
            <fi:include type="xpath">//pcc:pcc/pcc:personal-details/pcc:comm-addr</fi:include>
            <fi:include type="xpath">//pcc:pcc/pcc:personal-details/pcc:career-history</fi:include>
           </fi:what>
         </fi:filter>
        </fi:filter-set>
    </cp:transformations>
</cp:ruleset>
</document-rule>
</ap-rules>
```

[Fig. 7]

```
POST /org.openmobilealliance.xdcp/org.openmobilealliance.cab-pcc/users/sip:alice@
    example1.com/cab-pcc/pcc HTTP/1.1
Host xcap.example1.com Content-Type: application/xdcp-document+xml; charset="utf-8"
Content-Length: (…)

<?xml version="1.0" encoding="UTF-8"?>
<xdcp-document xmlns="urn:oma:xml:xdm:xdcp-document' >
  <request>
    <forward>
      <recipients-list>
        <list>
          <entry uri="sip:bob@example.com"/>
        </list>
      </recipients-list>
      <note>contact subscription invitation</note>
      <display-name>happy alice</display-name>
      <delivery-report>true</delivery-report>
      <request-id>abab1212</request-id>
      <data>
        <PCC>my friends view</PCC>
        <!--filter to be applied to the CAB User's PCC before the recipient invite for
contact subscriptoin-->
        <fi:filter-set>
         <fi:ns-bindings>
        <fi:ns-binding prefix="pcc" urn="urn:oma:xml:cab:pcc"/>
        </fi:ns-bindings>
        <fi:filter id="invite-include">
         <fi:what>
          <fi:include type="xpath">//pcc:pcc/pcc:personal-details/pcc:name</fi:include>
          <fi:include type="xpath">//pcc:pcc/pcc:personal-details/pcc:comm-addr</fi:include>
          <fi:include type="xpath">//pcc:pcc/pcc:personal-details/pcc:career-history</fi:include>
         </fi:what>
        </fi:filter>
       </fi:filter-set>
      </data>
    </forward>
  </request>
</xdcp-document>
```

[Fig. 8]

```
POST /org.openmobilealliance.xdcp/org.openmobilealliance.cab-pcc/users/sip:bob@example.com HTTP/1.1
Host xcap.example.com Content-Type: application/xdcp-document+xml; charset="utf-8"
Content-Length: (...)

<?xml version="1.0' encoding="UTF-8"?>
<xdcp-document xmlns="urn:oma:xml:xdm:xdcp-document">
   <request>
      <forward-remote>
         <document-uri>http://xcap.example.com/org.openmobilealliance.cab-pcc/temp/myfriends.xml
      </document-uri>
         <recipients-list>
            <list>
               <entry uri="sip:bob@example.com"/>
            </list>
         </recipients-list>
         <note>contact subscription invitation</note>
         <display-name>happy alice</display-name>
         <delivery-report>true</delivery-report>
         <request-id>abab1212</request-id>
         <size>800</size>
         <sender-identity>"sip:alice@example1.com"</sender-identity>
         <expiration-time>Thu, 01 Jul 2010 16:00:00 GMT</expiration-time>
         <content-type>application/vnd.oma.cab-pcc+xml</content-type>
   </request>
</xdcp-document>
```

```
<contact-status>
    <contact-type> CAB </contact-type>
    <entry-status>
     <updated>contact-invitation</updated>
     <note>contact subscription invitation</note>
    </entry-status>
</contact-status>
```

[Fig. 11]

```
<request-notification-list auid="org.openmobilealliance.pcc">
    <request document-uri="http://xcap.example.com/org/openmobilealliance.cab-pcc/
    users/sip:alice@example1.com/cab-pcc/pcc">
    <sender-identity>"sip:alice@example1.com "</sender-identity>
    <expiration-time>Tue, 29 Sep 2011 16:00:00 GMT </expiration-time>
    <status>accepted</status>
    <content-type>application/vnd.oma.cab-pcc+xml</content-type>
    <note>contact subscription invitation</note>
```

APPARATUS AND METHOD FOR INVITING SUBSCRIPTION TO CONTACT INFORMATION

PRIORITY

This application is a National Stage application under 35 U.S.C. § 371 of International Application No. PCT/KR2012/010638 filed Dec. 7, 2012, which claims priority under 35 U.S.C. § 365(b) to Korean Patent Application No. 10-2011-0131358 filed Dec. 8, 2011, the content of each of which is incorporated herein by reference.

TECHNICAL FIELD

The present invention relates generally to a Converged Address Book (CAB) service, and more particularly, to an apparatus and a method for inviting subscription to contact information based on a converged address book service.

BACKGROUND ART

A converged Address Book (CAB) service refers to an address book service based on a single network which stores address information usable by various terminals of a user, allows the information to be accessible by any device anytime and anywhere, and synchronizes the address information. Such a converged address book service corresponds to a service provided for a purpose of improving a user experience for the address book and a function of the address book by storing a single network address book in a network. Main functions of the converged address book service may include an address book synchronization, contact subscription, contact share, contact search, an external address book import from a non-CAB system and the like.

Among the above-listed functions, the contact subscription function is performed though a method in which an originating side invites a receiving side to subscribe to contact information of the originating side. To this end, in the prior art, the method is implemented in a type of directly transmitting information on a subscription request subject to the receiving side and storing the information, and then transmitting a contact status information as illustrated in FIG. 1.

Figure 1:
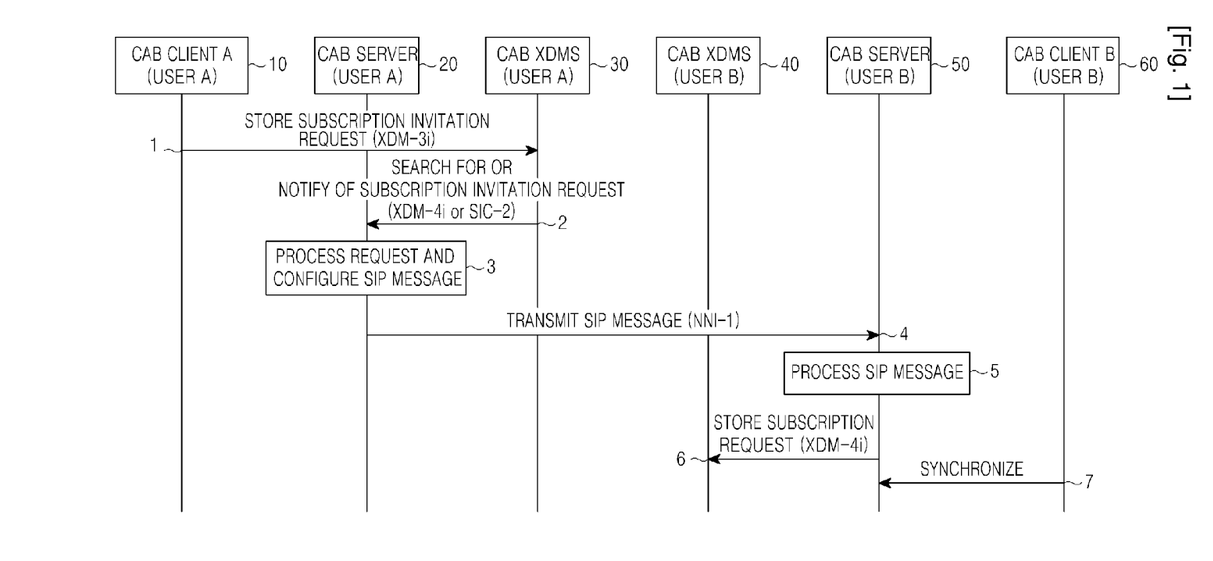
FIG. 1 is a view for describing a conventional contact information subscription invitation method.

Referring to FIG. 1, when a CAB client A 10 stores a subscription invitation request in a CAB server 20 in step 1, the CAB server 20 performs a series of operations in order to invite a user B of a CAB client B 60 to subscribe to contact information of the CAB client A 10. However, in the prior art, all contact information of the CAB client A 10 is transferred to a CAB server 50 including the CAB client B 60 in step 4 regardless of whether the CAB client B 60 accepts the subscription or not. When the subscription is accepted in step 5, information on the subscription request subject, that is, the entire received contact information and the subscription invitation are stored in step 6, and the user B of the CAB client B 60 recognizes that the user A invites the user B to subscribe to the contact information of the user A in step 7. Further, when the subscription is not accepted in step 5, the received all contact information is not stored.

DISCLOSURE OF INVENTION

Technical Problem

As described above, although the CAB client A 10 invites the CAB client B 60 to subscribe to contact information of the user A, entire contact information of the user A is transmitted in step 4. Accordingly, even though the user A desires to share only a part of contact information of the user A with the user B, there is no method capable of supporting it. Further, since actual contact information is transmitted to the CAB server 50 of the user B from the CAB server 20 of the user A regardless of whether the CAB client B 60 has accepted or rejected the subscription invitation, an efficiency is deteriorated in that a processing capacity is inefficiently used and an unnecessary storage space within the CAB server and the CAB XDMS is used.

In addition, when the user B of the CAB client B 60 rejects the subscription in step 5, all requests from other clients are totally rejected as well as the request for subscribing the contact information of the CAB client A 10. That is, acceptance or rejection cannot be set individually for each client. Therefore, a method of efficiently inviting the subscription to contact information is required.

Solution to Problem

Accordingly, the present invention provides an apparatus and a method for efficiently inviting the subscription to contact information.

Further, the present invention provides an apparatus and a method for inviting the selective subscription to only a part of the contact information.

In accordance with an aspect of the present invention, a method of inviting a subscription to contact information in a converged address book server is provided. The method includes receiving a subscription invitation request of particular contact information of a first client from the first client; and determining whether a condition for allowing the subscription to the particular contact information is included in the subscription invitation request, and transmitting a subscription request containing address information by which the condition and the particular contact information can be received to a second client when the condition is included.

In accordance with another aspect of the present invention, there a converged address book XML Document Management Server (XDMS) for inviting a subscription to contact information is provided. The converged address book XDMS includes a converged address book feature handler application usage for, when receiving a subscription invitation request of particular contact information of a first client from the first client, notifying a converged address book server of a contact share request containing a condition of allowing a subscription to the particular contact information; and a personal contact card application usage for storing particular contact information filtered by the condition by the converged address book server and forwarding a subscription request containing address information by which the particular contact information can be received to a second client.

Advantageous Effects of Invention

According to the present invention, it is possible to provide a more efficient contact information managing method to the user through the system and method proposed by the present invention. Further, according to the present invention, the originating side can make a request for subscribing only a desired part of all contact information, and the receiving side can selectively receive only contact information of a desired client. In addition, by transmitting address information on contact information instead of actual contact information, it is possible to increase a transmission efficiency and also increase a storage efficiency of the CAB server and the CAB XDMS.

BRIEF DESCRIPTION OF DRAWINGS

FIG. 6 illustrates an example of an access permission document for allowing the subscription of a receiver of FIG. 3;

BEST MODE FOR CARRYING OUT THE INVENTION

Hereinafter, various embodiments of the present invention will be described with reference to the accompanying drawings. The same elements will be designated by the same reference numerals although they are shown in different drawings. Further, a detailed description of known functions and configurations incorporated herein will be omitted when it may make the subject matter of the present invention rather unclear.

In the detailed description which will be described below, representative embodiments of the present invention to solve the above mentioned technical problems will be suggested. Further, for convenience of the description of the present invention, names of entities defined in a Converged Address Book (CAB) of the Open Mobile Alliance (OMA) which is a standard organization of an application of a mobile terminal will be used, but the standard and names do not limit the scope of the present invention and may be applied to a system having a similar technical background to that of the present invention.

The present invention proposes a method of efficiently performing a contact information subscription invitation. Accordingly, the present invention includes a process in which, when a first client makes a request for a subscription invitation of a particular contact information of the first client, a CAB server determines whether a condition allowing the subscription of the particular contact information is included and transmits a subscription request containing the condition and address information of the particular contact information to a second client. Through the process, it is possible to provide a communication service at a high speed in a communication system supporting various types of communication services without a waste of resources, power, or memories. Further, it is possible to provide a data transmission/reception method capable of easily and quickly providing a CAB service according to a selection by a user's intention.

Referring to a conceptual structure of an OMA CAB through FIG. 1, a CAB service system includes a converged address book (hereinafter, referred to as a "CAB") client 100, a CAB server 110, a CAB XML document management server (hereinafter, referred to as a "CAB XDMS) 120, and a non-CAB system 130.

First, the CAB client 100 communicates with the CAB server 110 on a terminal, and serves to authenticate a CAB user, synchronize Personal Contact Card (hereinafter, referred to as a "PCC") information and a converged address book stored in a network storage space, and transmit requirements of the CAB user, for example, a address subscription, address search, address share, interaction with a conventional address book, or management of user preference to the CAB server 110.

Particularly, the CAB client 100 according to an embodiment of the present invention refers to a terminal of the user A, and serves to transmit a contact share request for recommending the user B to subscribe to contact information of the user A according to a request of the user A. The contact share request contains a filter value as a condition for allowing a part of a contact view in personal information (PCC). The contact share request refers to a request for subscribing to a part of the contact information of the user A by the user B, and particularly, may contain a filter value to inform what the part of the contact information requested to be subscribed to is.

Here, the contact information according to an embodiment of the present invention contains at least one of an address book, business card information, and personal information (PCC), and the contact view refers to, for example, making some information such as the personal information including as a name, a phone number, and an e-mail address be one group according to a need of the user. That is, the contact view means selectively extracting a part of all contact information to be shared and then forming the extracted information as a subset.

The CAB server 110 is a main component of the network in the CAB structure, and serves to receive a request of the CAB user from the CAB client 100 and process the request. As main functions, the CAB server 110 serves to mutually authenticate the CAB client, store a CAB address, synchronize address information, receive an address information update from the address subscription function and reflect the address information update in the address book.

The CAB server 110 performs an operation for a network management of reflecting an address subscription/share/ conversion, a user preference/policy and the like. Further, the CAB server 110 has an interworking function (IWF) of interworking with a conventional address book system or exposing an interface to an external enabler.

The CAB server 110 receives a contact information share request containing a filter value for allowing a selective subscription to the contact information from the CAB client 100. Then, the CAB server 110 generates address information by which particular contact information of the CAB client 100 selected according to the filter value is received. The request containing the newly generated address information is transferred to the CAB server (for example, XDMS 140) including the user B through the CAB server (for example, XDMS 130) including the user A. As described above, the CAB server 110 serves to newly generate the address information by which the contact information may be received, that is, URL information, instead of actual contact information in order to reduce transmission loads and to provide the URL information.

The CAB XDMS 120 for managing data of the user includes a CAB Address Book Application (CAB AB App) usage for storing the converged address book and a contact status for distinguishing between a conventional user and the CAB user, a CAB User Preference Application (CAB UP App) usage for storing user preference, a CAB Personal Contact Card Application (CAB PCC App) usage for storing personal contact card information, and a CAB Feature Handler Application (CAB FH App) usage for managing a CAB service request and response. In addition, the CAB XDMS 120 includes an XDMC for accessing various application usage functions, an SIP/IP core network for a message routing with entities of an external domain, a PUSH enabler for transferring a notification message of non-SIP terminals and the like.

Figure 2:
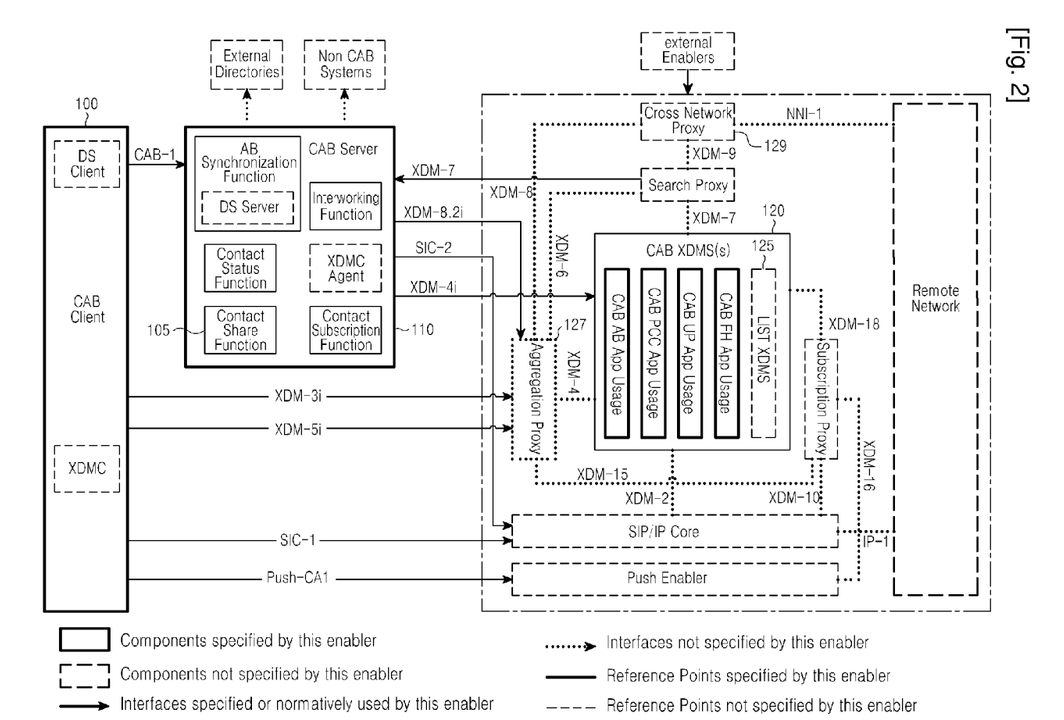
FIG. 2 is a configuration diagram of a system for a contact information subscription invitation according to an embodiment of the present invention.

In an embodiment of the present invention, when the user desires to invite another user to subscribe to personal profile information, for example, PCC information within the converged address book system of FIG. 2, a new schema for making a contact share request containing a standardized invitation message (for example, "contact subscription invitation) is defined within the CAB feature handler app. usage. On the other hand, the CAB server 110 gives the receiver a right for the subscription to the personal profile information for the corresponding contact share request, transmits the corresponding contact share request to a receiving side, and processes the contact share request containing the corresponding personal profile information subscription invitation according to the user preference for the subscription request of another person set by the receiver, that is, acceptance, rejection, and confirmation, which finally proposes a method of inviting the receiver to subscribe to the contact information in a form of the contact status information. Here, the user preference confirmation refers to a setting to inform the receiver of the subscription request of another person and ask whether to accept the subscription request.

Figure 3:
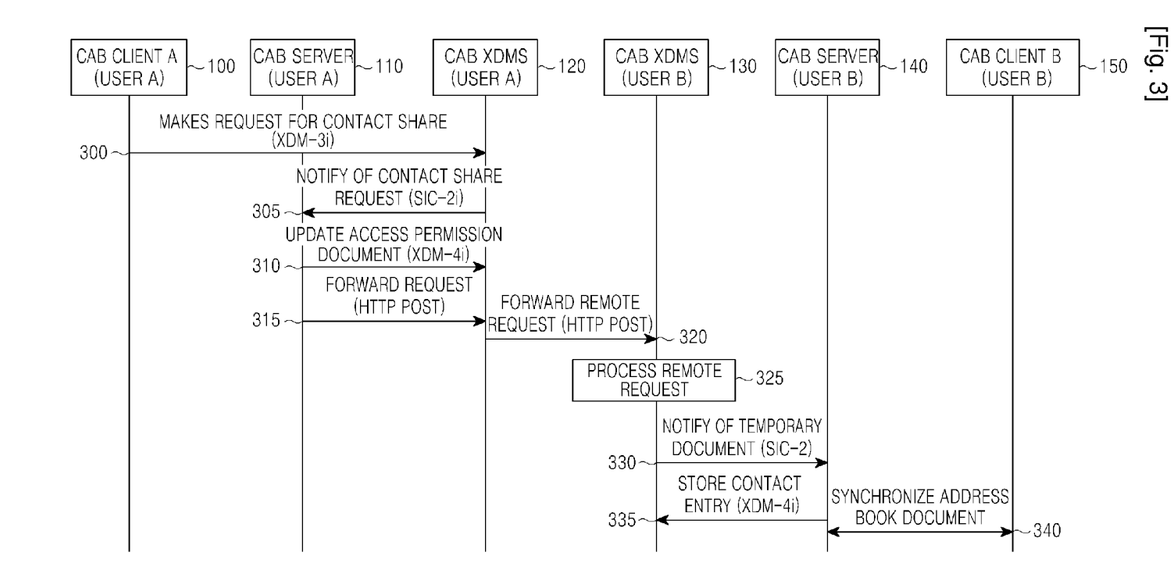
FIG. 3 illustrates a contact information subscription invitation process according to an embodiment of the present invention.

In order to describe the user preference confirmation in detail, a contact information subscription invitation process according to an embodiment of the present invention will be described with reference to FIG. 3. FIG. 3 illustrates an example of a contact information subscription invitation method through XML document delivery.

Referring to FIG. 3, the CAB client A 100 transmits the contact share request to the CAB feature handler app. usage within the CAB XDMS 130 in step 300. At this time, an XML Configuration Access Protocol (XCAP) request is used for the contact share request. The contact share request contains a standardized invitation message for inviting a receiver, for example, XUI: sip:bob@example.com to subscribe the contact information for a particular contact view among the personal information (PCC) and a selective filter value for allowing to subscribe to only a part of the contact view. Further, it is apparent that the standardized invitation message can be automatically generated by a server having received the contact information subscription invitation message of the receiver.

In response to the request, the CAB XDMS 130 notifies of the contact share request in step 305. To this end, the CAB feature handler app. usage within the CAB XDMS 130 informs a contact share function 105 within the CAB server 110 of a document change of the CAB feature handler, that is, document update information in response to the contact share request.

The CAB server 110 updates an access permission document of the receiver in step 310. Specifically, the access permission document is updated in the PCC app. usage within the CAB XDMS 120 based on the document update information in response to the contact share request obtained in step 605 in order to allow the subscription of the receiver according to the contact information subscription invitation of an originator. At this time, filter information contained for limiting the subscription to the contact information is also reflected to the access permission document. This corresponds to a process of authenticating the receiver, for example, user B to subscribe to the contact information of the originator, for example, user A in advance. The CAB server 110 may receive a plurality of different subscription permission requests from contact information of a plurality of receivers of the user A, and serve to manage the subscription permission requests, that is, creation, update, deletion and the like for the plurality of subscription permission requests for the user A.

Subsequently, the CAB server 110 forwards the request in step 315. In order to forward the request, the CAB server 110 generates and uses an XDCP forward request. The XDCP forward request contains a standardized message for the contact information subscription invitation and a filter value for allowing to subscribe to only a part of the contact view. Particularly, the CAB server 110 generates URL information by which particular contact information can be actually received, inserts the generated URL information into the forward request, and transmits the forward request. As described above, since the present invention uses an "HTTP POST" instead of a conventional "SIP MESSAGE", only information by which contact information is received can be transmitted instead of actual contact information, and also partial contact information can be provided through a filter value.

The XDCP forward request is transmitted to the PCC app. usage within the CAB XDMS 120. The CAB XDMS 120 generates a new contact view by applying the filter for allowing to subscribe to only a part of a particular contact view designated for a subscription invitation by the originator, that is, user A, and then stores the generated new contact view in a temporary storage space or a separate document storage space within the PCC app. usage. Subsequently, the CAB XDMS 120 forwards a remote request containing a URI value for the document and the standardized message for the contact information subscription invitation in step 320. Further, the CAB XDMS 120 may generate the URI value so that only the particular contact view can be shown to a particular receiver by applying the filter from all contact information. For the remote request, an XDCP forward remote request is used.

The XDCP forward remote request is transmitted to the CAB XDMS 130 including the receiving side, that is, the user B. Then, the PCC app. usage of the CAB XDMS 130 processes the remote request based on the received XDCP forward remote request in step 325. That is, the CAB XDMS 130 performs a preference confirmation for address book document delivery of the user B. The preference for the address book document delivery may include settings such as acceptance, rejection, confirmation and the like. The acceptance means to directly store the received document without asking the user B when the user B receives a subscription request from another person, the rejection means not to accept the subscription request of another person, and the confirmation means to inform the user B of the subscription request of another person, receive a response (for example, acceptance or rejection) to the subscription request from the user B, and process the response. Accordingly, when the preference corresponds to the acceptance, the CAB XDMS(130) fetches a document to be used for the contact information subscription invitation from a server storing the document by using the URI value of the document received from the user A, and stores the document as a temporary document, for example, in a type of ContactInvitationPCC.xml The CAB server 140 of the receiving side is informed of the temporary document from the PCC app. usage of the CAB XDMS 130 in step 330. Specifically, the CAB server 140 is informed of a contact invitation document containing "ContactSharePCC.xml" corresponding to the temporary document and a "note" element as a document change or informed of a contact invitation document containing "ContactInvitationPCC.xml" and the "note" element as a document change.

The CAB server 140 stores a contact entry in step 335. An example of the contact entry includes an address, and address share data is converted according to an address book format and then added to an Address Book document (AB document) within the AB app. usage of the XDMS 130. Further, an address type is displayed as a contact status, an update type (<updated>) is displayed as an entry status, and the <note> element corresponding to the standardized message (or expression) for the contract information subscription invitation transmitted from the originator is displayed, with reference to the contact invitation document in step 330.

Thereafter, the CAB server 140 transmits a server notification message containing the document change generated in the AB app. usage to synchronize the address book of the CAB client B 150 in step 340. Accordingly, the user B of the CAB client B 150 can view the contact information of which subscription is allowed by the user A through the synchronization of the address book.

Figure 4:
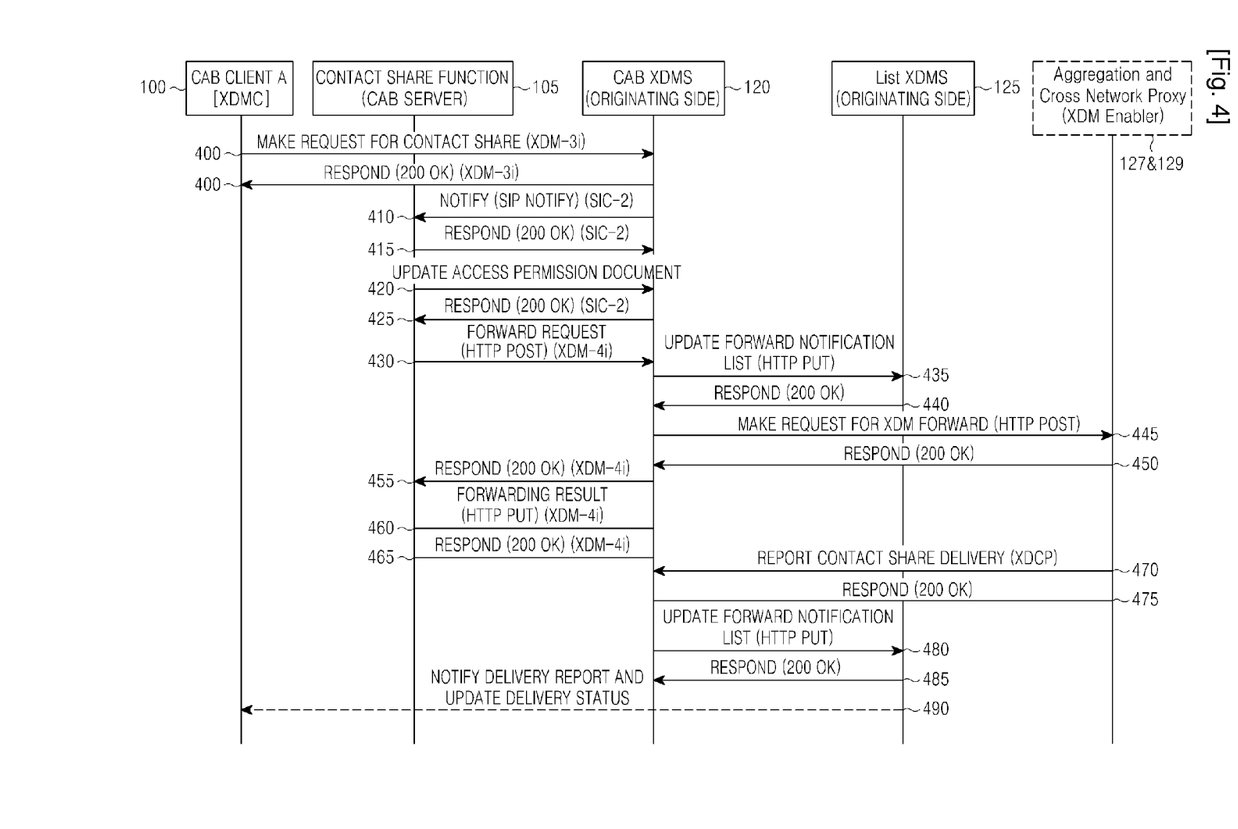
FIG. 4 illustrates the process of FIG. 3 in detail.

Hereinafter, the description of FIG. 3 will be made in more detail with reference to FIG. 4. FIG. 4 illustrates contact information share in an originating side in detail.

Referring to FIG. 4, step 400 is the same as step 300 of FIG. 3. In a more detailed description, the contact share request contains a result report of the share request, and the standardized message for the contact information subscription invitation which is the 'contact subscription invitation" is contained in the "note" element within the share request. The message for the contact share request is illustrated in FIG. 5.

Figure 5:
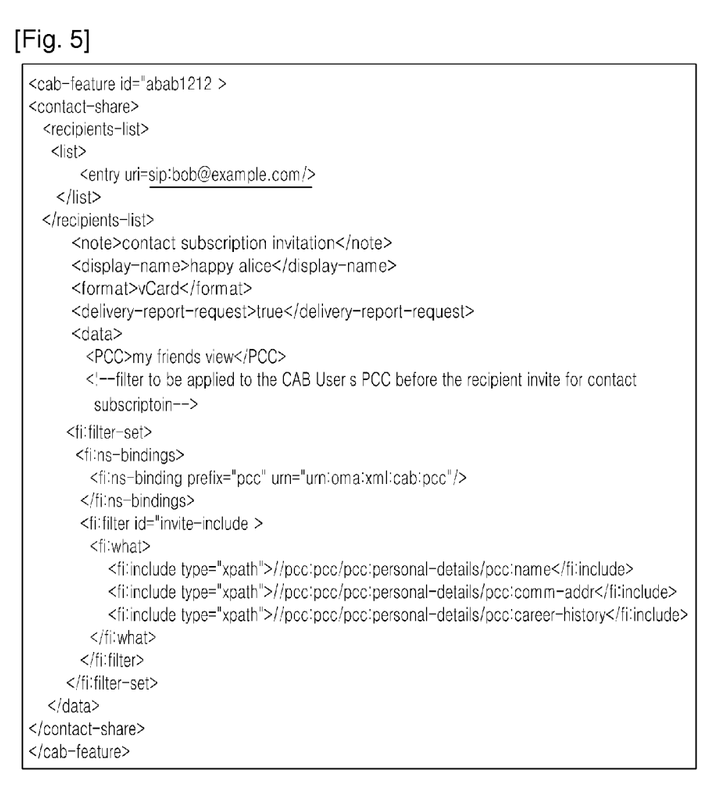
FIG. 5 illustrates an example of contact share request message of FIG. 3.

Referring to FIG. 5, in a later time, the standardized message which is the "contact subscription invitation" in the "note" element serves as an indication indicating that the contact share request is a request for sharing the contact for the contact information subscription invitation of the originator in the originating side and the receiving side. Further, in FIG. 5, when the subscription to the contact information of the originator is attempted after the receiver (XUI: sip:bob@example.com) finally accepts the contact information subscription invitation only for a name, a contact (comm-addr), and a career (career-history), a filter value for allowing only a partial value of the corresponding document is set to subscribe to or read the contact information.

In step 405, the CAB feature handler app. usage of the CAB XDMS 120 stores the XCAP request and transmits a response message (200 OK) to the CAB client A 100.

In step 410, the CAB feature handler app. usage informs the contact share function 105 within the CAB server 110 of the document change of the CAB feature handler, that is, document update information for the corresponding share request. Here, the contact share function 105 may obtain change information within the CAB feature handler by actively identifying whether the contact share request message is stored, separately from the CAB feature handler app. usage informing the change information.

In response to step 410, the contact share function 105 transmits a response message (200 OK) to the CAB feature handler app. usage in step 415. Subsequently, step 420 is the same as step 310 of FIG. 3. In a more detailed description, the contact share function 105 updates an access permission document based on filter information included within the document update information for the contact share request obtained in step 410 to limit the subscription to the receiver information and the contact information by using an XDM agent in order to allow the subscription of the receiver according to the contact information subscription invitation of the originator within the corresponding PCC app. usage.

FIG. 6 illustrates an example of an access permission document for allowing the subscription of the receiver according to the contact information subscription invitation within the PCC app. usage.

Referring to FIG. 6, "allow-retrieve" which is a document rule of the personal information (PCC) in the contact information of the originator (XUI: sip:alice@example1.com) means that the receiver can subscribe to or read entire contact information of the originator. Further, by updating the access permission document based on filter information (invite-include) included in the document update information for the contact share request obtained in step 410 to limit the subscription to the receiver (XUI: sip:bob@example.com) information and the contact information, subscription or reading is allowed when the receiver finally accepts the contact information subscription invitation only for a name, a contact, and a career (career-history) among the personal information of the originator and attempts to subscribe to the contact information of the originator.

Figure 7:
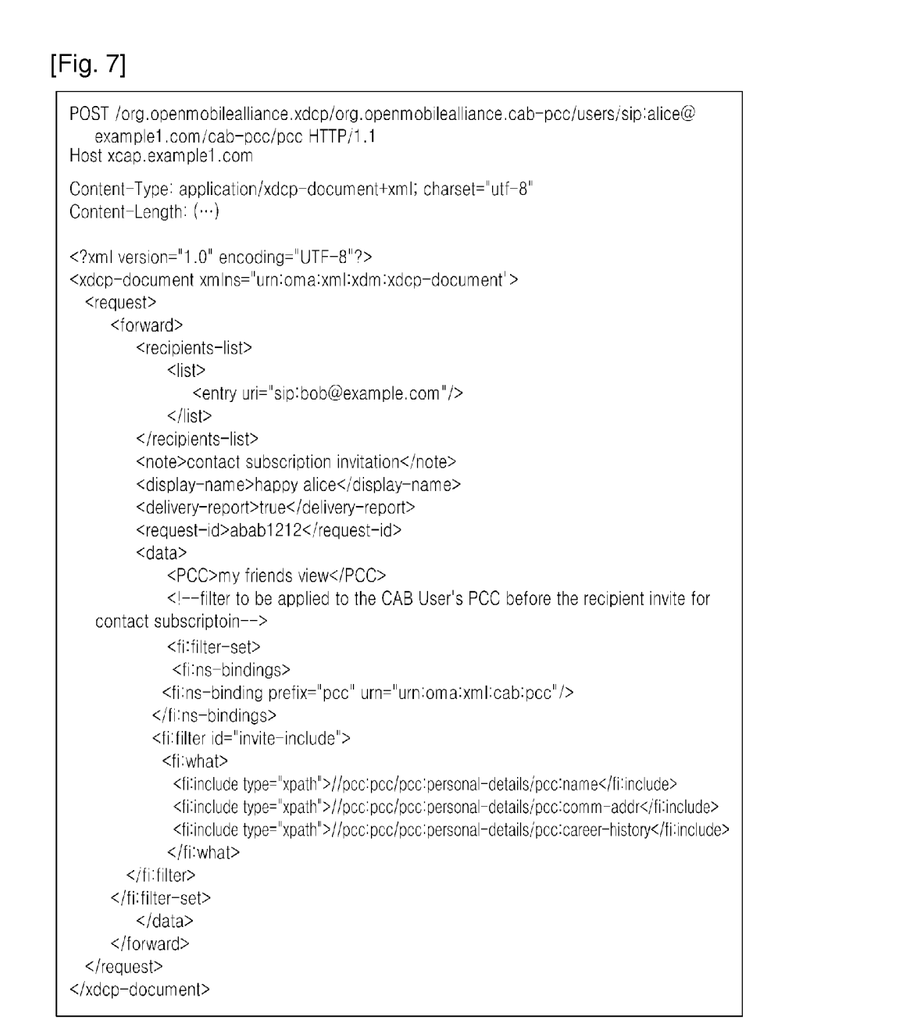
FIG. 7 illustrates an example of an XDCP forward request message of FIG. 4.

The contact share function 105 receives a response message (200 OK) from the PCC app. usage in step 425 and then generates and transmits the XDCP forward request to share the contact information with the corresponding PCC app. usage by using the XDM agent in step 430. At this time, the filter information for allowing to subscribe to only a partial value of the contact view obtained in step 410 is included. Further, the standardized message (or expression) for the contact information subscription invitation which is the "contact subscription invitation" is included in the "note" element within the XDCP forward request. The XDCP forward request generated by the contact share function 105 is illustrated in FIG. 7.

Subsequently, the PCC app. usage first identifies whether a contact share delivery report for contact share of the originator is made in step 435. Subsequently, for notification of a delivery result to the originator, related information is updated by inserting the "note" element into a delivery notification list (<delivery-notification-list>) element of a forward notification list (<forward-notification-list>) element within a forward notification list (hereinafter, referred to as an "FNL") app. usage of a List XDMS and setting a delivery status value of the corresponding receiver as "pending". In response to the update, the PCC app. usage receives a response message (200 OK) from the List XDMS 125 in step 440.

Then, the PCC app. usage identifies that the receiver is a user of another domain based on the XDCP forward request, applies the filter for allowing to subscribe to only the partial value of the particular contact view designated for the subscription invitation by the originator, and then stores the contact view in a temporary storage space or a separate document storage space within the PCC app. usage.

Figure 8:
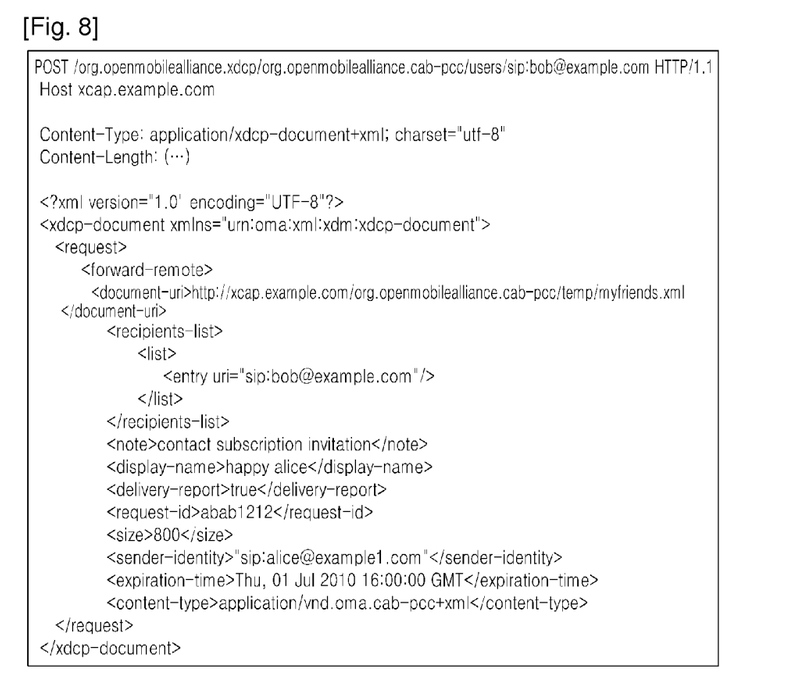
FIG. 8 illustrates an example of an XDCP forward remote request message of FIG. 4.

An then, an XDCP forward remote request containing a URI value for the document and a standardized message for a personal information subscription invitation to a receiving side in step 445. The XDCP forward remote request generated by the PCC app. usage of an originating side is illustrated in FIG. 8. Thereafter, the PCC app. usage receives a response message (200 OK) for a delivery result from networks 127 & 129 of the receiving side in step 450. Then, the PCC app. usage generates a response message (200 OK) for the XDCP forward request from the response message (200 OK) for the delivery result in step 455.

Thereafter, the contact share function 105 stores a forwarding result in step 460. That is, the contact share function 105 stores the delivery result in the CAB feature handler app. usage, and the CAB feature handler app. usage transmits the response message (200 OK) to the contact share function 105 in step 465.

In step 470, the PCC app. usage receives a contact share delivery report from the networks 127&129 of the receiving side. In response to step 470, the PCC app. usage transmits a response message (200 OK) to the networks 127&129 of the receiving side in step 475.

Then, the PCC app. usage updates a forward notification list in step 480. Specifically, for notification of a delivery result to the receiver, related information is updated by setting a delivery status value of the corresponding receiver as "delivered" in a delivery notification list (<delivery-notification-list>) element of a forward notification list (<forward-notification-list>) element within the forward notification list (hereinafter, referred to as an "FNL") of the List XDMS. When the update is completed, the PCC app. usage receives a response message (200 OK) form the List XDMS 125 in step 485.

Thereafter, in step 490, the XDM agent within the CAB server 120 is informed of a result of the delivery report and updates a delivery status of the corresponding contact share request within the CAB FH app. usage in step 190.

Figure 9:
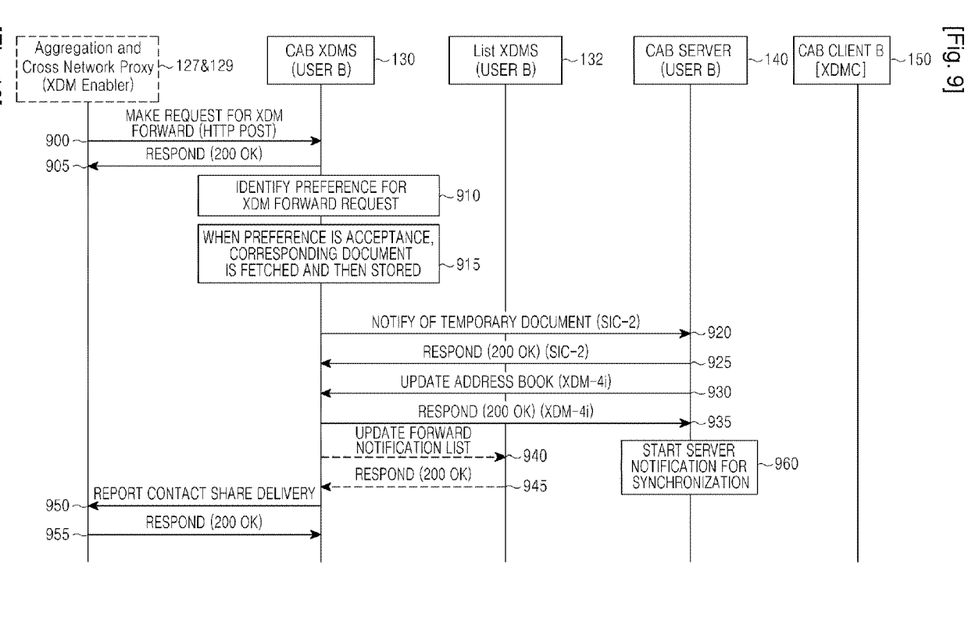
FIG. 9 illustrates a contact information subscription invitation process in an accepted status according to an embodiment of the present invention.

Meanwhile, FIG. 9 illustrates in detail a method of inviting to subscribe to personal information when user preference for XML document delivery of the receiver is set as 'accept'.

Referring to FIG. 9, the PCC app usage including the CAB client B 150 receives the XDCP forward remote request from the networks 127&129 of the originating side in step 900. Then, the PCC app. usage identifies whether the receiver within the XDCP forward remote request is in a corresponding domain and then transmits a response message (200 OK) to the PCC app. usage including the CAB client A 100 in step 905.

Subsequently, the PCC app. usage of the CAB XDMS 130 identifies preference of the CAB client B 150 for the XDCP forward remote request from the AB forward preference within the AB app. usage in step 910. The AB forward preference includes the following cases, and a case where the CAB client B 150 receives (accepts) an XDM resource received from the CAB client A 100 is described herein.

When the preference corresponds to the acceptance, the XDM resource transmitted from the originating side is automatically stored in a corresponding XDM server in step 915. On the other hand, when the preference corresponds to the confirmation, the XDM resource transmitted from the originating side is informed to the receiver and then a result thereof is waited for. However, when the preference corresponds to the rejection, the XDM resource transmitted from the originating side is not stored in the corresponding XDM server and is rejected. In addition, when the preference corresponds to the rejection, steps after step 920 are not performed.

Specifically, since the URI of the document included in the XDCP forward remote request, that is, the filter value set by the originator to allow to subscribe to only the partial value of the particular contact view designated by the originator for the subscription invitation is applied, the PCC app. usage of the receiving side fetches an XDM resource from the PCC app. usage of the originating side by using the URI of the document stored in the temporary storage space within the PC app. usage of the originating side or the separate storage space. Then, as shown in the conventional address share request method, the XDM resource may be stored in a document form of "ContactSharePCC.xml", or stored in a new document form of "ContactInvitationPCC.xml" after the standardized message (or expression) for the personal information subscription invitation which is the "contact subscription invitation" in the "note" element included in the XDCP forward remote request.

Subsequently, the CAB server 140 is informed of a temporary document from the PCC app. usage of the receiving side in step 920. Specifically, the CAB server 140 is informed of "ContactSharePCC.xml" and a contact invitation document containing the "note" element as a document change, or informed of "ContactInvitationPCC.xml" and a contact invitation document containing the "note" element as a document change. Further, according to a system implementation, the contact invitation document may not be included by separately generating the contact invitation document containing the "note" element, but may be included within a notification request message (SIP NOTIFY) in a new header form. For example, the CAB server 140 is informed of the document change in a form of the "ContactSharePCC.xml" and the contact invitation document. The CAB server 140 may actively obtain information corresponding to document change information within the PCC app. usage in the receiving side separately from being informed of the information from the PCC app. usage in the receiving side.

In response to the reception, the CAB server 140 transmits a response message (200 OK) to the PCC app. usage in step 925, and then updates an address book in step 930. Specifically, the CAB server 140 converts contact information share data to an AB format, and then adds the converted contact information share data to an AB document within the AB app. usage. And then, the CAB server 140 displays an address type below as a contact status, an update type (<updated>) as an entry status, and the <note> element corresponding to the standardized message (or expression) for the personal information subscription invitation transmitted from the originator, with reference to the contact invitation document or a "note" related header included in the notification request message.

Figure 10:
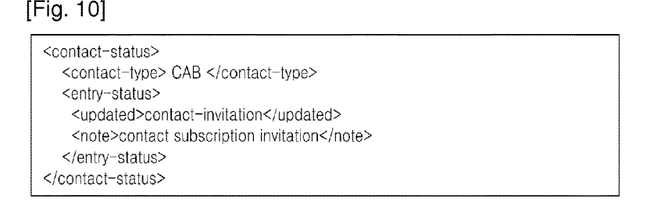
FIG. 10 illustrates an example of a contact status of FIG. 9.

Such a contact status is illustrated in FIG. 10. FIG. 10 shows the contact status added for the contact information subscription invitation in addition to the contact share data within the AB document.

Thereafter, the AB app. usage transmits a response message (200 OK) to the CAB server 140 in step 935.

The PCC app. usage adds a <request-notification-list> element to a forward notification list of the List XDMS 132 to notify the receiver of a detailed matter of the received XDCP forward remote request in step 940. At this time, the "note" element which is the standardized message (or expression) for the contact information subscription invitation is also stored in the contact information share request. The <request-notification-list> element including the "note" element within the forward notification list of the List XDMS 132 is illustrated in FIG. 11.

Figure 11:
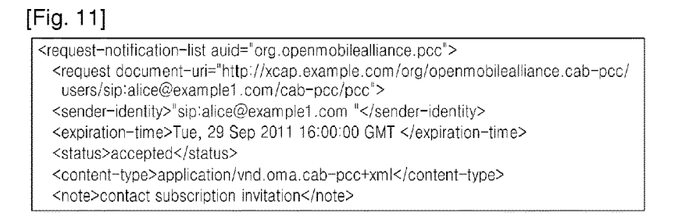
FIG. 11 illustrates an example of a request notification list of FIG. 9.

As illustrated in an example of the request notification list of FIG. 11, the receiver may identify information on an originator (XUI: sip:alice@example1.com) and the standardized message (or expression) for the contact information subscription invitation through the corresponding request notification list. Here, change information of the corresponding request notification list of the List XDMS 132 can be notified to the receiver or the receiver can actively identify the corresponding request notification list of the List XDMS 132 to obtain the change information of the corresponding request notification list of the List XDMS 132.

In step 945, the List XDMS 132 transmits a response message (200 OK) to the PCC app. usage. Subsequently, the CAB XDMS 130 generates a contact share delivery report and transmits the contact share delivery report to the networks 127&129 of the originating side in step 950. In response to step 950, the CAB XDMS 130 receives a response message (200 OK) from the networks 127&129 of the originating side in step 955.

Thereafter, the CAB server 140 transmits a server notification message including the document change generated in the AB app. usage to synchronize the address book of the CAB client B 150 to the CAB client B 150 in step 960.

Additionally, when the receiving side identifies the subscription invitation of the originating side and then accepts the subscription invitation and subscribes to information, a contact information subscription process in a later time is performed according to a general procedure. However, in this case, a contact information subscription result is informed according to a setting of allowing the subscription or the reading when the receiver (XUI: sip:bob @ example-.com) accepts the contact information subscription invitation and finally attempts to subscribe to the contact information of the originator only for a name, a contact (comm-addr), and a career (career-history) through the preset access permission within the PCC app. usage of the originator, that is, a filter ID corresponding to "invite-include" in step 420 of FIG. 4, and the contact information is updated according to the user preference.

Further, when the user preference for the XML document delivery of the receiving side is the confirm, not the acceptance, the contact share is completed by adding the received AB document to the AB app. usage, setting a contact status as "temporary", synchronizing the address of the CAB client B 150, directly expressing a confirmation intention by the receiver, and removing the "temporary" status.

In addition, the present invention implements a personal information subscription invitation method by transmitting the contact share request to the CAB server through the CAB FH app. usage. However, in other cases, that is, according to a system implementation, the above embodiments may be modified within an allowable range of a general XDM document management function implementation in a converged address book system where the contact share request is transmitted to the CAB XDMS in a form of XDM document delivery through a direct interface for an XDM document delivery request/response between the CAB client and the CAB XDMS, but an overall operation and method are the same within the scope of the present invention.

Finally, although the present invention implements a method of inviting a contact information subscription between different domain users, the method of inviting the contact information subscription between different domain users may be implement with some modifications in a contact information subscription invitation between the same domain users within an allowable range of a general XDM document management function implementation in a CAB server and a CAB XMDS within the same domain but an overall operation and method are the same within the scope of the present invention.

According to the present invention, it is possible to provide a more efficient contact information managing method to the user through the system and method proposed by the present invention. Further, according to the present invention, the originating side can make a request for subscribing only a desired part of all contact information, and the receiving side can selectively receive only contact information of a desired client. In addition, by transmitting address information on contact information instead of actual contact information, it is possible to increase a transmission efficiency and also increase a storage efficiency of the CAB server and the CAB XDMS.

The invention claimed is:

1. A method of sharing contact information in a first converged address book XML Document server (CAB XDMS), the method comprising:
    receiving, by the first CAB XDMS, a first request for sharing contact information from a first client, the first request including information for allowing a second client to subscribe to a part of the contact information of the first client and a filter value as a condition for allowing the second client to subscribe to a part of the contact information of the first client;
    notifying, by the first CAB XDMS, a first CAB server of a reception of the first request, the first CAB server being different from the first CAB XDMS;
    storing, by the first CAB XDMS, information on access permission corresponding to the second client, the information being updated by the first CAB server, in response to the notification of the reception of the first request;
    receiving, from the first CAB server by the first CAB XDMS, a second request for forwarding contact information;
    in response to receiving the second request, generating, by the first CAB XDMS, a third request including uniform resource identifier (URI) information that allows a second CAB XDMS of the second client to fetch the part of the contact information; and
    transmitting, by the first CAB XDMS, the third request to a second CAB XDMS of the second client,
    wherein the second request includes the URI information by which the part of the contact information is obtainable.

2. The method of claim 1, wherein the information on access permission includes information for filtering the contact information of the first client.

3. The method of claim 1, further comprising:
    receiving a delivery report of the third request from networks communicating with the second client; and
    storing a delivery status corresponding to the delivery report.

4. The method of claim 1, further comprising:
    wherein the second request is generated and forwarded by the first CAB server by using HTTP POST.

5. The method of claim 1, wherein a preference of the second client is one of acceptance, rejection, and confirmation for a transmission of the contact information.

6. The method of claim 1, wherein a result of the third request is stored by a contact share function of the first CAB server.

7. The method of claim 1, further comprising:
receiving a delivery report of the first request from networks communicating with the second client.

8. A first converged address book XML Document Management server (CAB XDMS) for sharing contact information, comprising:
a communication unit;
a memory; and
a processor configured to:
receive a first request for sharing contact information from a first client through the communication unit, the first request including information for allowing a second client to subscribe to a part of the contact information of the first client and a filter value as a condition for allowing the second client to subscribe to a part of contact information of the first client,
notify a first CAB server of a reception of the first request, through the communication unit, the first CAB server being different from the first CAB XMAS,
store information on access permission corresponding to the second client, the information being updated by the first CAB server in response to the notification of the reception of the first request,
receive, from the first CAB server, a second request for forwarding contact information, through the communication unit,
in response to receiving the second request, generate a third request including uniform resource identifier (URI) information that allows a second management server to fetch the part of the contact information, and
transmit the third request to a second CAB XDMS of the second client, through the communication unit,
wherein the second request includes the URI information by which the part of the contact information is obtainable.

9. The first CAB XDMS of claim 8, wherein the information on access permission includes information for filleting the contact information of the first client.

10. The first CAB XDMS of claim 8, wherein the second request is generated and forwarded by the first CAB server by using HTTP POST.

11. The first CAB XDMS of claim 8, wherein a contact share function of the first CAB server stores a result of the second request.

12. The first CAB XDMS of claim 8, wherein the processor receives a delivery report of the first request from networks communicating with the second client, through the communication unit.

13. The first CAB XDMS of claim 8, wherein the processor receives a result of a delivery report through the communication unit and updates a delivery status of the first request in the memory.

14. A method of inviting a subscription to contact information in a converged address book XML Document Management Server (CAB XDMS) communicating with a first client, the method comprising:
receiving a contact share request for inviting a second client to subscribe to the contact information;
notifying a CAB server of the contact share request, wherein the contact share request includes information for allowing the second client to subscribe to a part of contact information of the first client and a filter value as a condition for allowing the second client to subscribe to the part of the contact view information of the first client;
storing an access permission document for the second client updated by the CAB server in response to the notification of the contact share request;
receiving a first forward request for contact share from the CAB server;
in response to receiving the first forward request, generating a second forward request including uniform resource identifier (URI) information that allows a second CAB XDMS of the second client to fetch the part of the contact information; and
transmitting the second forward request to the second CAB XDMS communicating with second client,
wherein the first forward request includes the information and the filter value for allowing the second client to subscribe to the part of the contact information of the first client.

* * * * *